United States Patent [19]
Kato

[11] Patent Number: 5,908,374
[45] Date of Patent: Jun. 1, 1999

[54] TOOL CHANGER FOR MACHINE TOOL

[75] Inventor: Fumihiko Kato, Nagoya, Japan

[73] Assignee: Brother Kogyo Kabushiki Kaisha, Nagoya, Japan

[21] Appl. No.: 09/045,928

[22] Filed: Mar. 23, 1998

[30] Foreign Application Priority Data

Mar. 25, 1997 [JP] Japan .................................. 9-071957

[51] Int. Cl.⁶ ................................................ B23Q 3/155
[52] U.S. Cl. ................................ 483/42; 483/39; 483/40; 483/41; 483/42; 483/43; 483/44; 483/45; 483/46; 483/50; 483/1; 483/51
[58] Field of Search .................................. 483/39, 40, 41, 483/42, 43, 44, 45, 46, 50–51

[56] References Cited

U.S. PATENT DOCUMENTS

| | | | |
|---|---|---|---|
| 3,492,717 | 2/1970 | Seidel et al. | 483/42 |
| 3,579,812 | 5/1971 | Pfister | 483/40 |
| 3,608,188 | 9/1971 | Seidel | 483/42 |
| 3,719,907 | 3/1973 | Seidel | 483/42 X |
| 3,953,918 | 5/1976 | Bone et al. | 483/42 X |
| 3,964,616 | 6/1976 | Piotrowski | 483/34 |
| 3,990,585 | 11/1976 | Johansson | 483/41 |
| 4,575,918 | 3/1986 | Mattson | 483/1 |
| 4,835,838 | 6/1989 | Hirose | 408/35 |

FOREIGN PATENT DOCUMENTS

| | | | |
|---|---|---|---|
| 115540 | 5/1989 | Japan | 483/42 |
| B2-4-60774 | 9/1992 | Japan . | |
| 6-315841 | 11/1994 | Japan | 483/39 |
| B2-7-80109 | 8/1995 | Japan . | |

*Primary Examiner*—William Briggs
*Attorney, Agent, or Firm*—Oliff & Berridge, PLC

[57] ABSTRACT

A tool changer for a machine tool includes an arm support disposed between a spindle head and a tool magazine to be reciprocally moved along the spindle relative to the spindle, a pair of tool changing arms mounted for rocking motion on support shafts further mounted on the arm support to cross the spindle, respectively, holding mechanisms on one ends of the tool changing arms respectively, and a rotating mechanism for rotating the tool changing arms by 180 degrees about a center shaft parallel with the spindle. Each holding mechanism has a moving pin and a spring for urging the moving pin in a direction of projection of the pin. The moving pins are engaged with a tool attached to the spindle and another tool located at a standby position of the tool magazine when the tool changing arms are rocked about the support shafts so that the tools are detachably held by the holding mechanisms respectively.

12 Claims, 9 Drawing Sheets

TOOL CHANGER FOR MACHINE TOOL

BACKGROUND OF THE INVENTION

1. Field of the Invention

This invention relates to a tool changer for a machine tool which changes tools between a spindle mounted on a spindle head of the machine tool and a tool magazine provided with a plurality of tools.

2. Description of the Related Art

Conventional tool changers include those of the finger type and those of the transfer type. The tool changer of the finger type comprises a changing head rotatable and vertically movable. The changing head is provided with two pairs of opposed gripping claws each pair serving as a holding mechanism for holding a tool. Each pair of gripping claws are driven by a cam mechanism etc. to be opened and closed.

The tool changer of the finger type executes a tool changing operation in the following manner. First, a subsequently used tool is located at a standby position in a tool magazine. A tool currently attached to a spindle of a spindle head is gripped by one pair of gripping claws, whereas the tool located at the standby position is gripped by the other pair of gripping claws. The changing head is then moved downward so that the tools are pulled out of the spindle and the tool magazine respectively. The changing head is then rotated 180 degrees horizontally so that the positions of the tools are changed to each other. Thereafter, the changing head is moved upward so that the subsequently used tool is attached to the spindle, whereas the last used tool is returned to the tool magazine. Each pair of gripping claws are released from the gripping state, whereby the tool changing operation is completed.

According to the tool changer of the finger type, the changing head is rotated 180 degrees in one direction in every tool changing operation. This simplifies the mechanical construction of the tool changer for the control of rotation of the changing head. However, the gripping claws are used in the holding mechanism to detachably hold the tool. The gripping claws require a complicated opening and closing mechanism for opening and closing the gripping claws by means of the cam mechanism etc. Furthermore, the operations of the mechanism for opening and closing the gripping claws need to be synchronized with the rotation and the axial movement of the changing head. Consequently, the manufacturing cost of the tool changer is increased, and a high speed changing operation cannot be attained by the tool changer of the finger type.

On the other hand, the tool changer of the transfer type comprises a pivot arm normally and reversibly rotatable about a pivot and vertically movable. Two holding mechanisms are provided on both ends of the pivot and have moving pins axially urged by springs respectively.

The tool changer of the transfer type executes a tool changing operation in the following manner. First, a subsequently used tool is located at a standby position in a tool magazine. The pivot arm is located at a change standby position. The pivot arm is then rotated by an angle of θ in the reverse direction so that a tool currently attached to a spindle of a spindle head and the tool located at the standby position are gripped by the holding mechanisms provided on both ends of the pivot arm respectively. The pivot arm is then moved downward so that the tools are pulled out of the spindle and the tool magazine respectively. The pivot arm is then rotated 180 degrees in the normal direction so that the positions of the tools are changed to each other. The pivot arm is then moved upward so that the subsequently used tool is attached to the spindle, whereas the last used tool is returned to the tool magazine. Thereafter, the pivot arm is further rotated by the angle of in the normal direction to be returned to the change standby position, and each holding mechanism is released from the holding state.

According to the tool changer of the transfer type, the moving pins are urged by the respective springs in each holding mechanism thereof. Thus, since each holding mechanism has a simple construction, the manufacturing cost thereof can be reduced. Furthermore, a complicated control is not required for each holding mechanism. However, the pivot arm requires to be rotated in the normal and reverse directions in every tool changing operation. Furthermore, the pivot arm requires the two rotation angles of θ and 180 degrees. These requirements complicate the mechanical construction for the control of rotation of the pivot arm.

SUMMARY OF THE INVENTION

Therefore, an object of the present invention is to provide a tool changer wherein the construction of the holding mechanism for holding the tool can be simplified, and the mechanical construction for the control of rotation of tool changing arms can be simplified.

The present invention provides a tool changer executing a change of tools between a spindle which is mounted along a spindle axis on a spindle head of a machine tool and to which a tool is detachably attached, and a tool magazine provided with a plurality of tools detachably attached thereto and locating a tool to be subsequently used at a standby position. The tool changer comprises an arm support disposed between the spindle head and the tool magazine to be reciprocally moved along the spindle relative to the spindle, a pair of tool changing arms mounted for rocking motion on support shafts, the support shafts mounted on the arm support and extending generally perpendicular to said spindle axis, respectively, each tool changing arm having one end, holding mechanisms provided on the ends of the tool changing arms respectively, and rotating means for rotating each of the tool changing arms by 180 degrees about a center shaft parallel with the spindle. Each holding mechanism has a moving pin and urging means for urging the moving pin in a direction of projection of the moving pin. The moving pins are disengageably engaged with the tool attached to the spindle and the tool located at the standby position of the tool magazine when the tool changing arms are rocked about the support shafts so that the tools are detachably held by the holding mechanisms respectively.

According to the above-described tool changer, each holding mechanism has such a simplified construction that the moving pin is urged in the direction of projection thereof. In the tool changing operation, the pair of tool changing arms are rotated by 180 degrees about the center shaft parallel with the spindle. Consequently, the mechanical construction for the control of rotation of the tool changing arms can be simplified as compared with the tool changer of the transfer type in which the pivot arm requires to be rotated in the normal and reverse directions in every tool changing operation and the rotation angle of the pivot arm needs to be adjusted.

In a preferred form, the tool changing arms are reciprocally movable along the center shaft, and the tool changer further comprises arm side axial moving means for reciprocally moving the tool changing arms. In another preferred form, the spindle and the tool magazine are reciprocally movable along the center shaft, and the tool changer further comprises spindle side axial moving means for reciprocally moving the spindle and the tool magazine.

In further another preferred form, the tool changer further comprises cams provided on the spindle head and the tool magazine and cam followers provided on the tool changing arms to come into contact with the cams respectively. In this construction, the tool changing arms are rocked about the support shafts by a cam operation of the cams and cam followers respectively when the spindle head and the tool changing arms are moved along the spindle relative to the spindle.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENT

Figure 2:
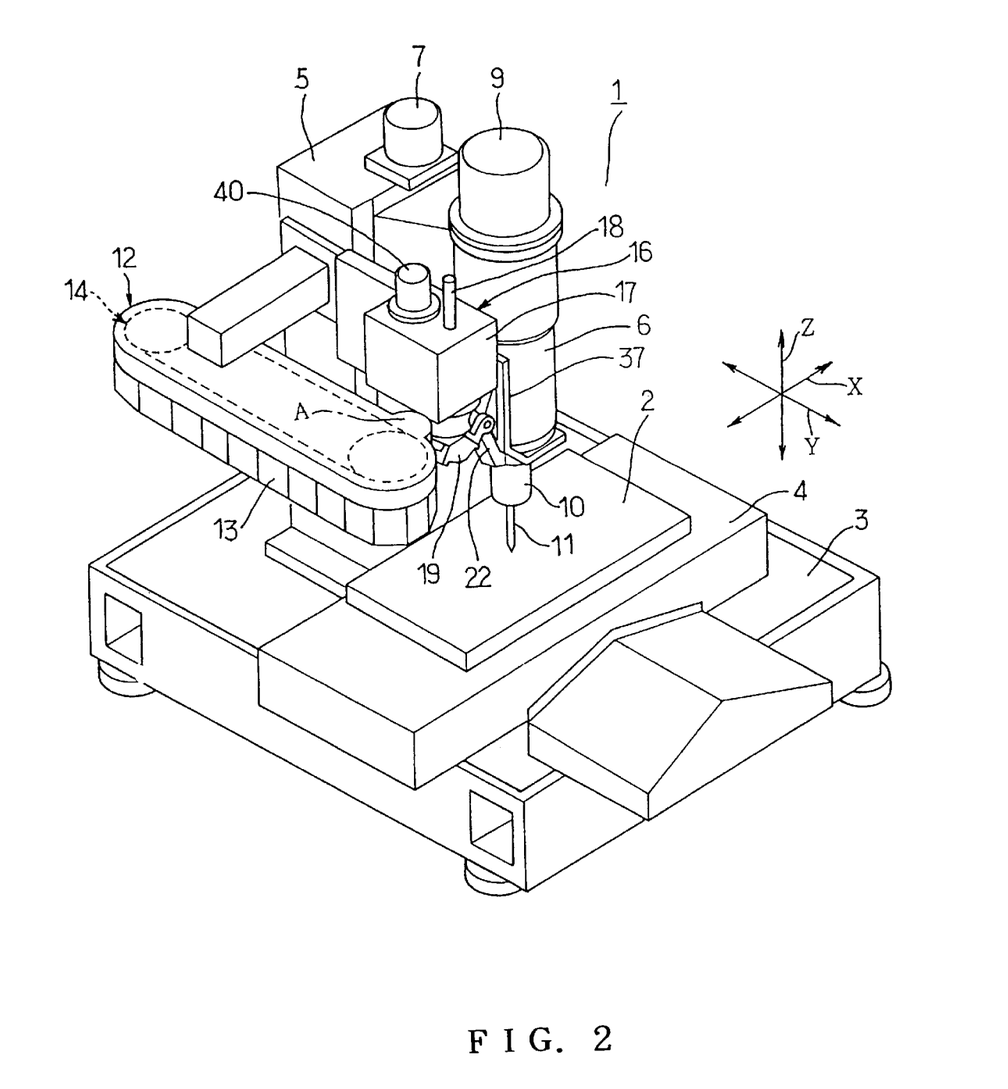
FIG. 2 is a schematic perspective view of the machine tool.

One embodiment of the present invention will be described with reference to the drawings. Referring first to FIG. 2, the overall construction of a machine tool 1 is shown. The machine tool 1 is a vertical machining center in which cutting and other machining operations are carried out for a workpiece (not shown) placed on a work table 2. The machine tool 1 includes a base 3 on which an intermediate table 4 is mounted to be moved in the Y direction, namely, forward and backward. The table 2 is further mounted on the intermediate table 4 to be moved in the X direction, namely, leftward and rightward.

A column 5 stands on a rear portion of the base 3. A spindle head 6 is mounted on a front portion of the column 5 to be moved in the Z direction, namely, upward and downward. The spindle head 6 is moved via a ball screw (not shown) by a spindle head driving motor 7 in the Z direction. A spindle 8 is mounted on the spindle head 6 so as to extend in the Z direction, as shown by dotted line in FIG. 1. The spindle 8 is rotated by a spindle driving motor 9. A tool holder 10 is mounted on a lower end of the spindle 8. A tool 11 is detachably attached to the tool holder 10. The spindle 8 and the tool 11 are integrally rotated to thereby machine the workpiece.

Figure 1:
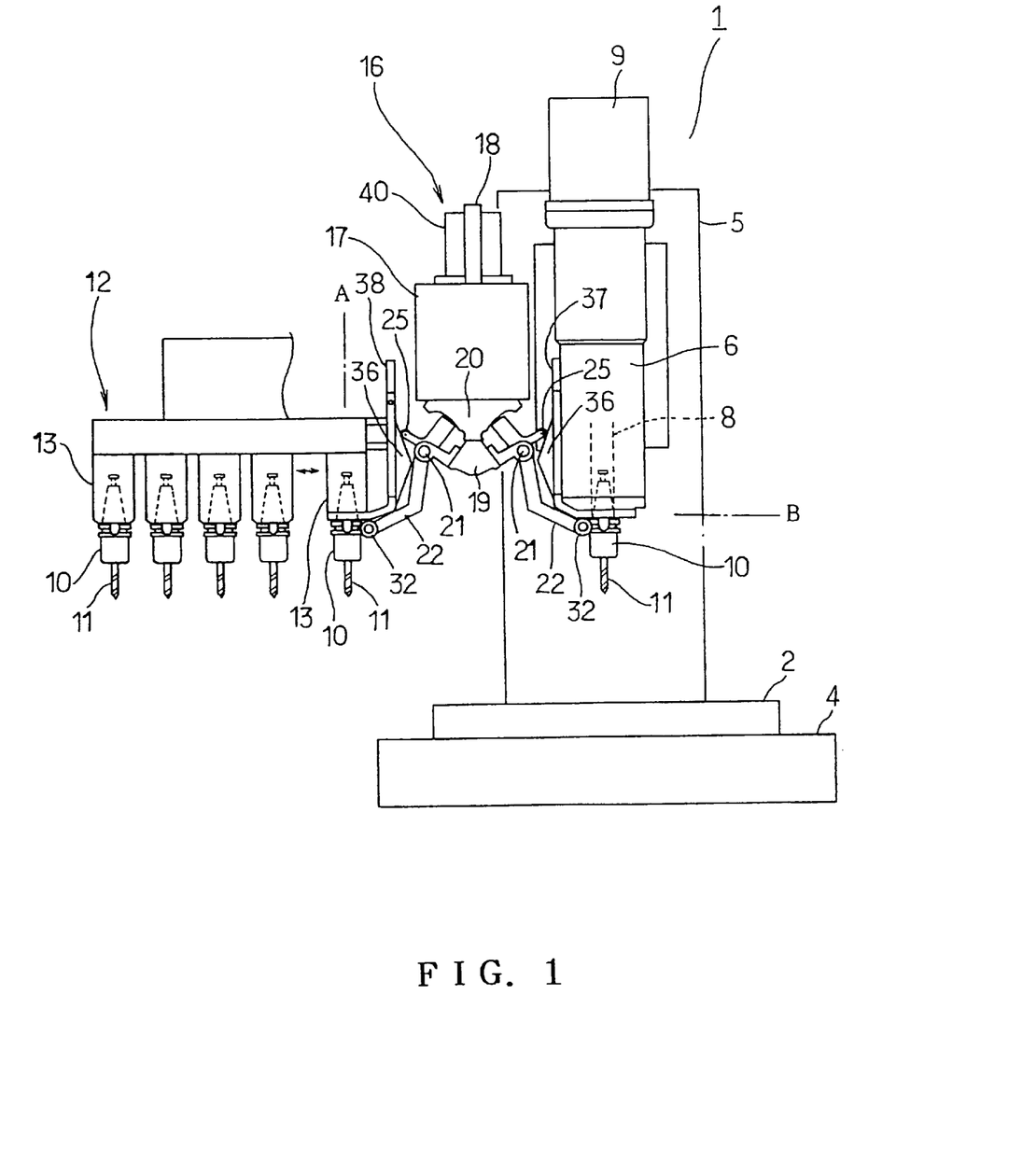
FIG. 1 is a partial front view of a machine tool equipped with a tool changer of one embodiment in accordance with the invention.

A tool magazine 12 is mounted at one side of the column 5. The tool magazine 12 is provided with a number of tool pots 13 to which the tools 11 are detachably attached via the tool holders 10 respectively, as shown in FIG. 1. One of the tool pots 13 to which the tool 11 to be subsequently used is indexed by a rotary indexing mechanism 14 and further extruded to a standby position A by an extruding mechanism (not shown) comprising an air cylinder, for example, thereby being positioned. The lastly used tool 11 is pulled back from the standby position A by the extruding mechanism.

Figure 3:
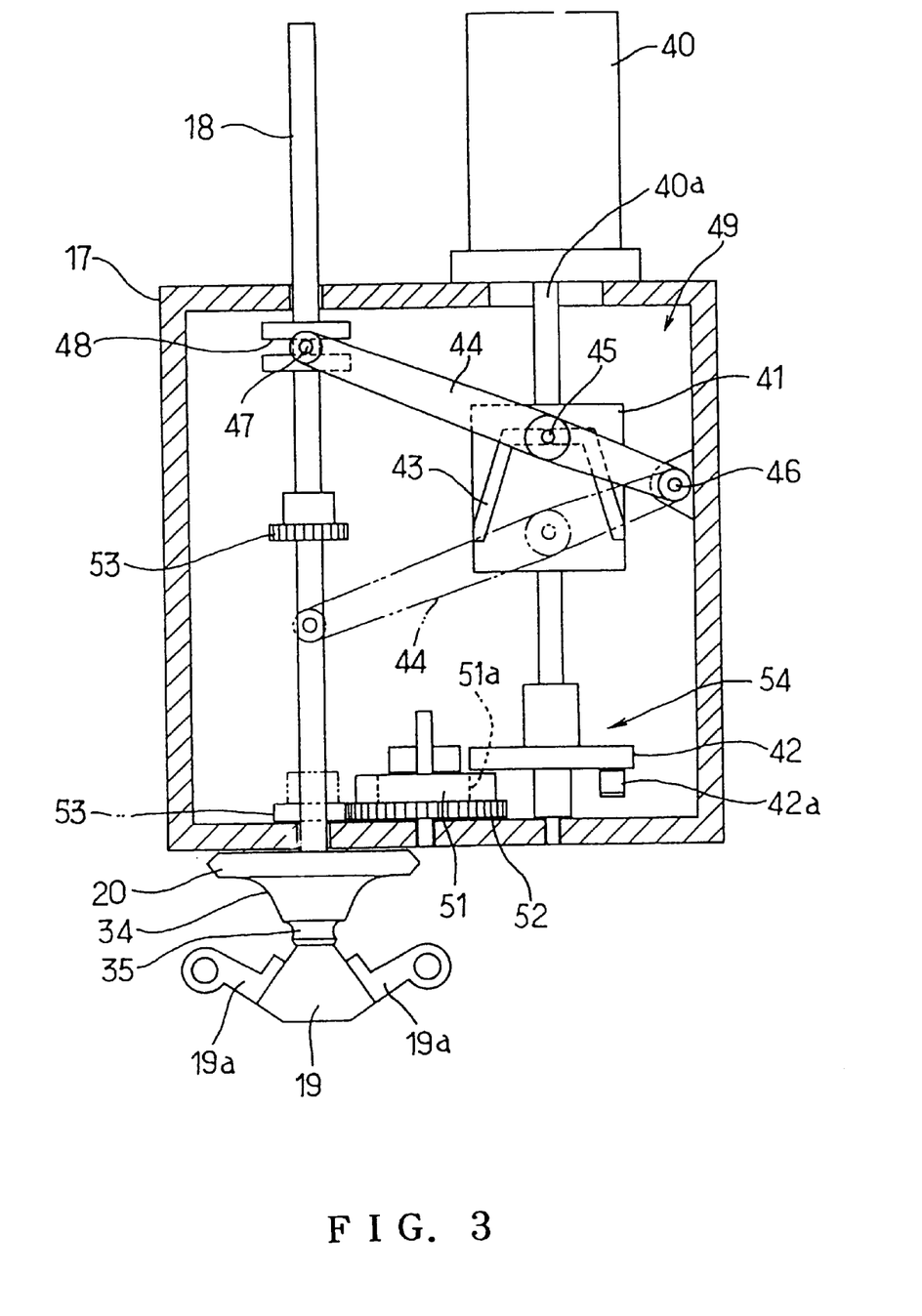
FIG. 3 is a partial longitudinal side section of the tool changer.

A tool changer 16 in accordance with the present invention is provided between the tool magazine 12 and the spindle head 6. The tool changer 16 includes a casing 17 fixed to the column 5. The casing 17 is provided with a center shaft 18 located in the middle between the standby position A of the tool magazine 12 and the spindle 8. The center shaft 18 is parallel with the spindle 8 and is directed in the Z direction, as shown in FIGS. 1 and 3. The center shaft 18 extends through the casing 17 upward and downward. The center shaft 18 is reciprocally movable in the Z direction and rotatable.

An arm support 19 is fixedly mounted on a lower end of the center shaft 18 to be located below the casing 17. An arm support collar 20 is disposed between the underside of the casing 17 and the arm support 19. The arm support 19 is reciprocally moved in the Z direction and rotated integrally with the center shaft 18, as shown in FIG. 3. The arm support 19 has two oppositely disposed arm support portions 19a protruding therefrom. A pair of tool changing arms 22 are supported via support shafts 21 (see FIG. 1) on the arm support portions 19a respectively. Each support shaft 21 is disposed to be perpendicular to the axes of the center shaft 18 and the spindle 18.

The above-mentioned tool changing arms 22 have the same construction. One of the tool changing arms 22 will now be described mainly with reference to FIG. 4. The tool changing arm 22 is formed with an insertion hole 22a through which the corresponding support shaft 21 is inserted. The tool changing arm 22 has a protrusion 23 and a cylindrical portion 24 each formed in the vicinity of the insertion hole 22a. The protrusion 23 is provided with a cam follower 25 which will be described in detail later. The cylindrical portion 24 accommodates therein a spring member 26 comprising a compression coil spring and a steel ball 27 urged in the direction of projection thereof by the spring member 26.

Figure 4:
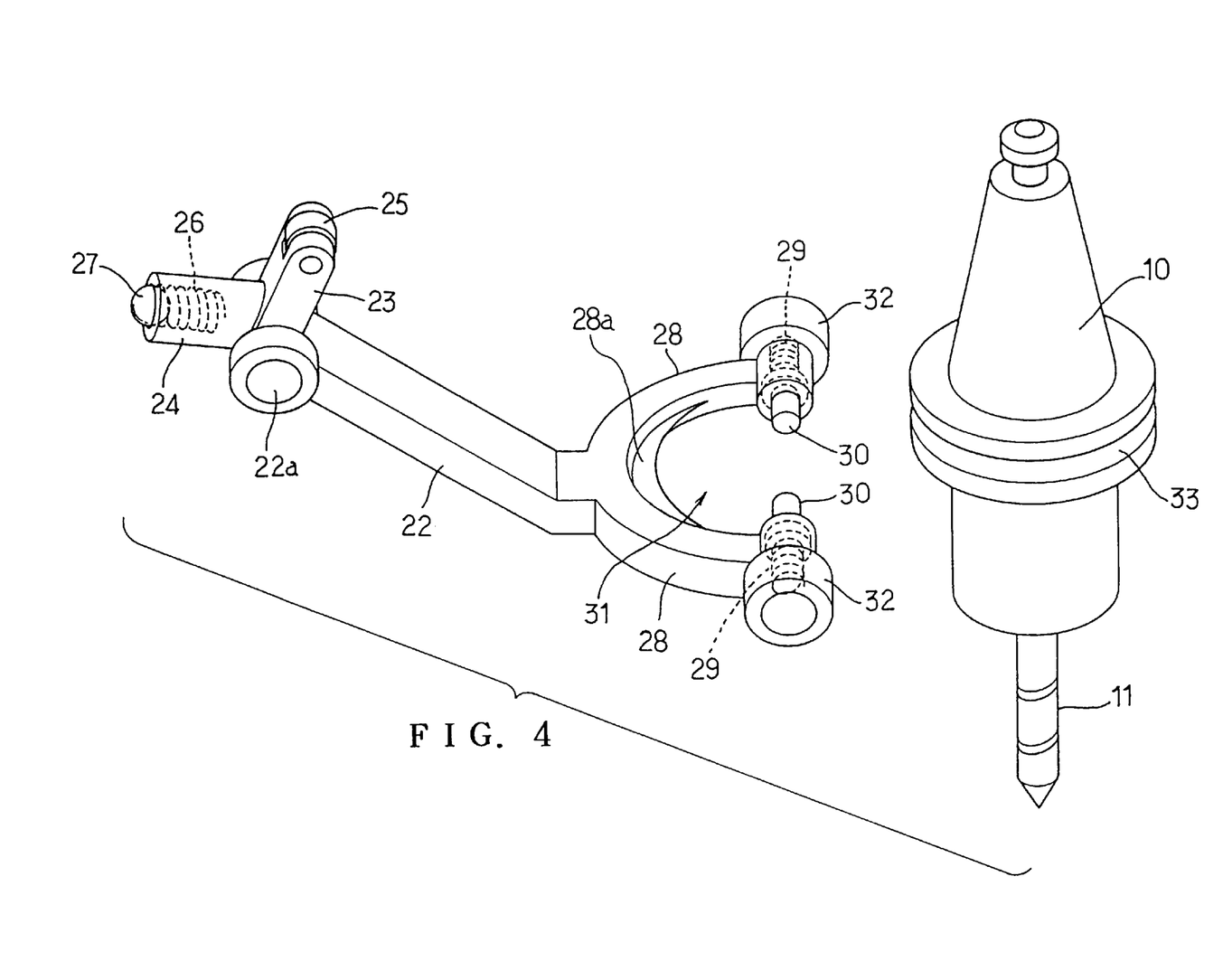
FIG. 4 is a perspective view of a tool changing arm and a tool holder.
Figure 9:
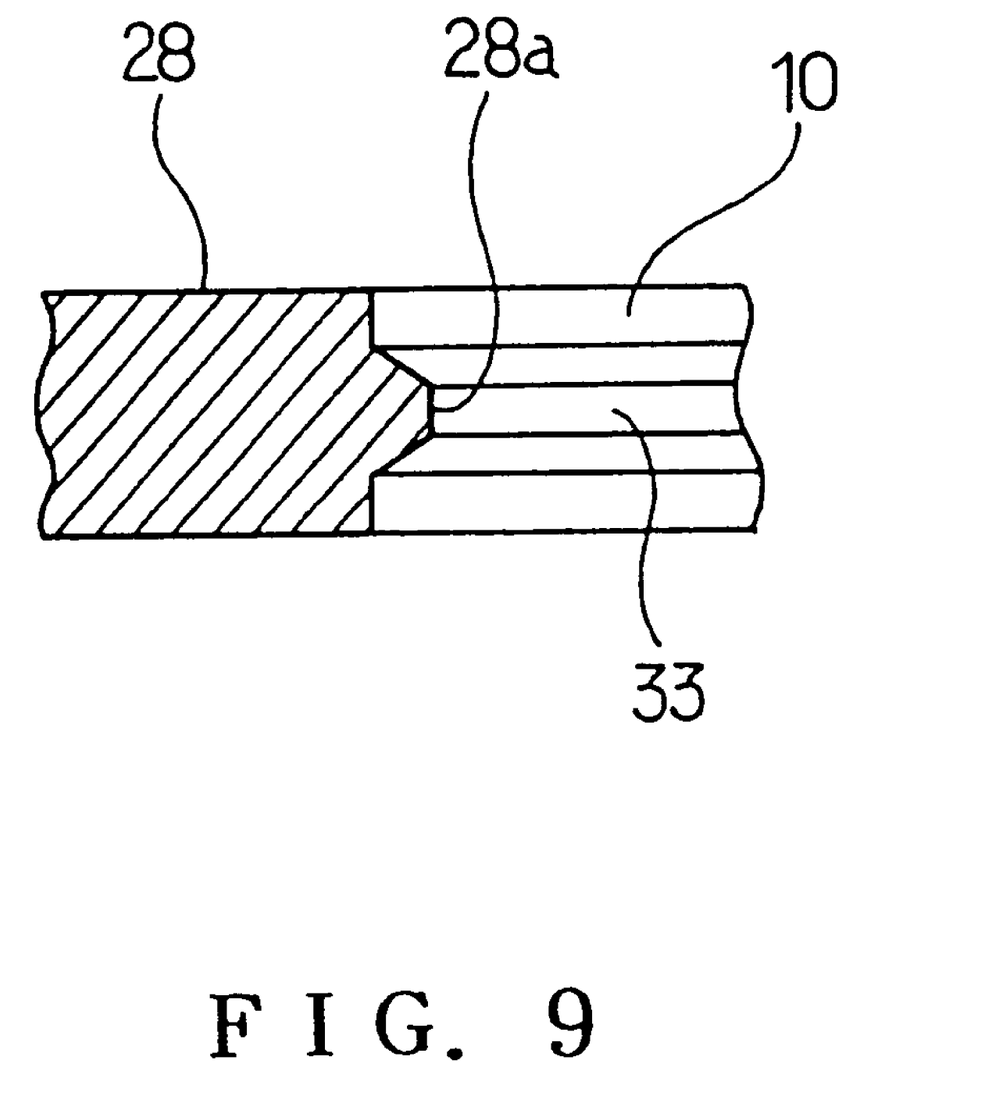
FIG. 9 is a partial sectional view of the tool changing arm and the tool holder.

The tool changing arm 22 further has two forked arms 28 formed on one end thereof or a right-hand end thereof into the shape of C, as viewed in FIG. 4. Each arm 28 has on its distal end a spring member 29 such as a compression coil spring serving as urging means and a moving pin 30 urged by the spring member 29 in the direction of projection of the moving pin. The moving pins 30 project in the directions opposite to each other. These two sets of the spring members 29 and the moving pins 30 constitute a holding mechanism 31 for detachably holding the tool 11. Each arm 28 further has on its distal end a cam follower 32 formed at the side opposed to the direction of projection of the moving pin 30. Each tool holder 10 has a chuck groove 33 formed in an outer periphery thereof. The distal ends of the moving pins 30 are inserted into the chuck groove 33 of each tool holder 10 to be engaged therewith. A convex portion 28a is formed to project from the inner periphery of the arms 28. The convex portion 28a is fitted into the chuck groove 33 of each tool holder 10, as shown in FIG. 9. A key plate (not shown) protrudes from a central inner periphery of the arms 28. Each tool holder 10 has in the outer periphery a key groove (not shown) into which the key plate is fitted so that each tool holder 10 and accordingly each tool 11 can be prevented from rotation when gripped by each tool changing arm 22 as will be described later.

Figure 7:
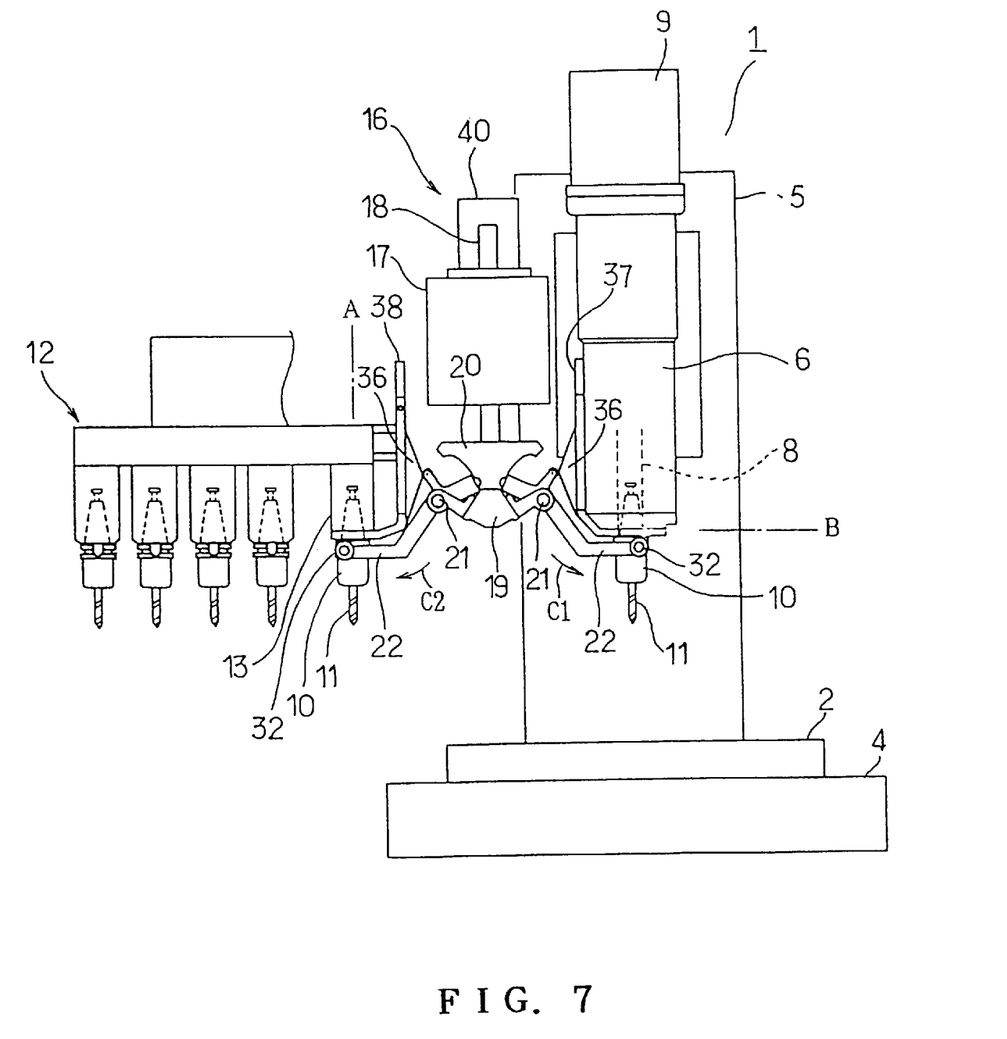
FIG. 7 is a view similar to FIG. 5, showing the condition where the tool changing arms have been moved to the tool holding positions.

The above-described arm support collar 20 has a guide face 34 formed on the outer periphery thereof and having an arcuate section, as shown in FIG. 3. A notch groove 35 is formed in the underside of the guide face 34. The above-mentioned steel ball 27, is elastically abutted against the guide face 34 when each tool changing arm 22 is rocked about the support shaft 21. Furthermore, each tool changing arm 22 is held at a position as shown in FIG. 7 when the steel ball 27 is fitted in the notch groove 35.

Two cam plates 37 and 38 are provided on one side of the spindle head 6 and one side of the tool magazine 12 respectively. Each of the cam plates 37 and 38 has a pyramidal cam projection 36 projecting toward the side of the corresponding tool changing arm 22. The cam plate 37 at the side of the spindle head 6 extends over to the underside of the spindle head 6, whereas the cam plate 38 at the side of the tool magazine 12 extends over to the underside of the tool pot 13 located at the standby position A. These cam plates 37 and 38 constitute cams cooperating with the cam followers 25 and 32 of the tool changing arms 22 respectively.

Referring now FIG. 3, a drive motor 40 for the change of tools is mounted on the top of the casing 17 so that a rotational shaft 40a thereof extends downward into the casing. A cylindrical cam 41 and a pin gear 42 having a pin 42a on a lower face thereof are mounted on the rotational shaft 40a in the casing 17 so as to be integrally rotated by the drive motor 40. The cylindrical cam 41 has a cam groove 43 formed in the outer periphery thereof. A vertically moving lever 44 has a cam follower 45 movably inserted in the cam groove 43. The vertically moving lever 44 is rotatably supported at one end thereof or a right-hand end thereof in FIG. 3 on a shaft 46 in the casing 17. Upon rotation of the cylindrical cam 41, the cam follower 45 is moved along the cam groove 43 relative to the cam groove so that a free end (left-hand end in FIG. 3) of the vertically moving lever 44 is vertically moved.

The vertically moving lever 44 has on the free end thereof an engagement pin 47 movably fitted in an engagement groove 48 formed in the outer periphery of the center shaft 18. Consequently, the center shaft 18 is moved in the Z direction or upward and downward upon vertical movement of the free end of the lever 44. Thus, the drive motor 40, the cylindrical cam 41, the vertically moving lever 41, the engagement pin 47 and the engagement groove 48 constitute an axial moving mechanism 49 for reciprocally moving the pair of tool changing arms 22 in the Z direction.

A Geneva gear 51 and a first spur gear 52 are disposed to be located between the center shaft 18 and the rotational shaft 40a of the drive motor 40 in the lower interior of the casing 17. These gears are integrally rotated. The pin gear 42 and the Geneva gear 51 constitute a Geneva mechanism. The pin 42a of the pin gear 42 is engaged with a pin groove 51a of the Geneva gear 51 so that the Geneva gear 51 is intermittently rotated every predetermined angle.

A second spur gear 53 is mounted on the center shaft 18 to be located below the engagement groove 48 in the casing 17. The second spur gear 53 is meshed with the first spur gear 52 when the center shaft 18 is moved to its lowermost position. The first spur gear 52 in mesh engagement with the second spur gear 53 is rotated with the Geneva gear 51 so that the center shaft 18 and accordingly the pair of tool changing arms 22 are rotated via the second spur gear 53 by 180 degrees. Thus, the drive motor 40, the pin gear 42, the Geneva gear 51 and the first and second spur gears 52 and 53 constitute a rotation mechanism 54 for rotating the tool changing arms 22 in one direction about the center shaft 18 by 180 degrees. The rotating mechanism 54 serves as rotating means in the invention.

Figure 5:
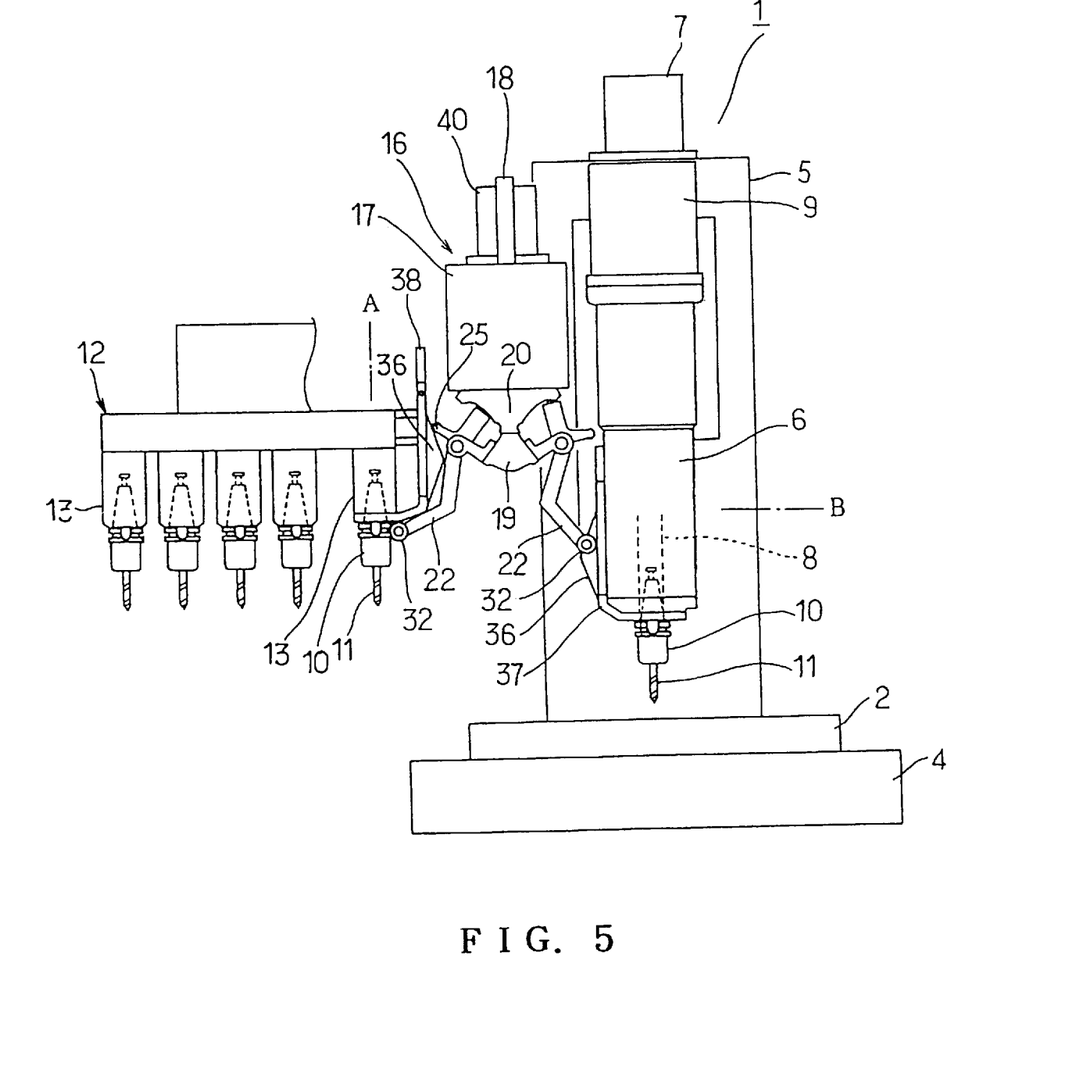
FIG. 5 is a front view of the machine tool wherein the spindle head is located at a working position.

A tool changing operation of the tool changer will be described FIGS. 5 to 8. FIG. 5 shows the case where the workpiece is machined by the tool 11 attached to the spindle 8. The tool 11 attached to the lower end of the spindle 8 is located lower than a tool changing position B. The machining is normally executed with the tool being located lower than the tool changing position B. Another tool 11 to be subsequently used is located at the standby position A at the side of the tool magazine 12. The center shaft 18 of the tool changer 16 is located at its uppermost position, so that the pair of tool changing arms 22 are located at their uppermost positions. One of the tool changing arms 22 at the side of the tool magazine 12 is located so that the cam follower 25 thereof is abutted against an inclined face of the cam projection 36 at the tool magazine 12 side and the cam follower 32 on the distal end of the tool changing arm 22 is abutted against the underside of the cam plate 38. Furthermore, the moving pins 30 face the chuck groove 33 of the tool holder 10 located at the standby position A. The tool changing arm 22 at the side of the spindle head 6 is located so that the cam follower 32 at the distal end thereof is abutted against the side of the cam plate 37.

Figure 6:
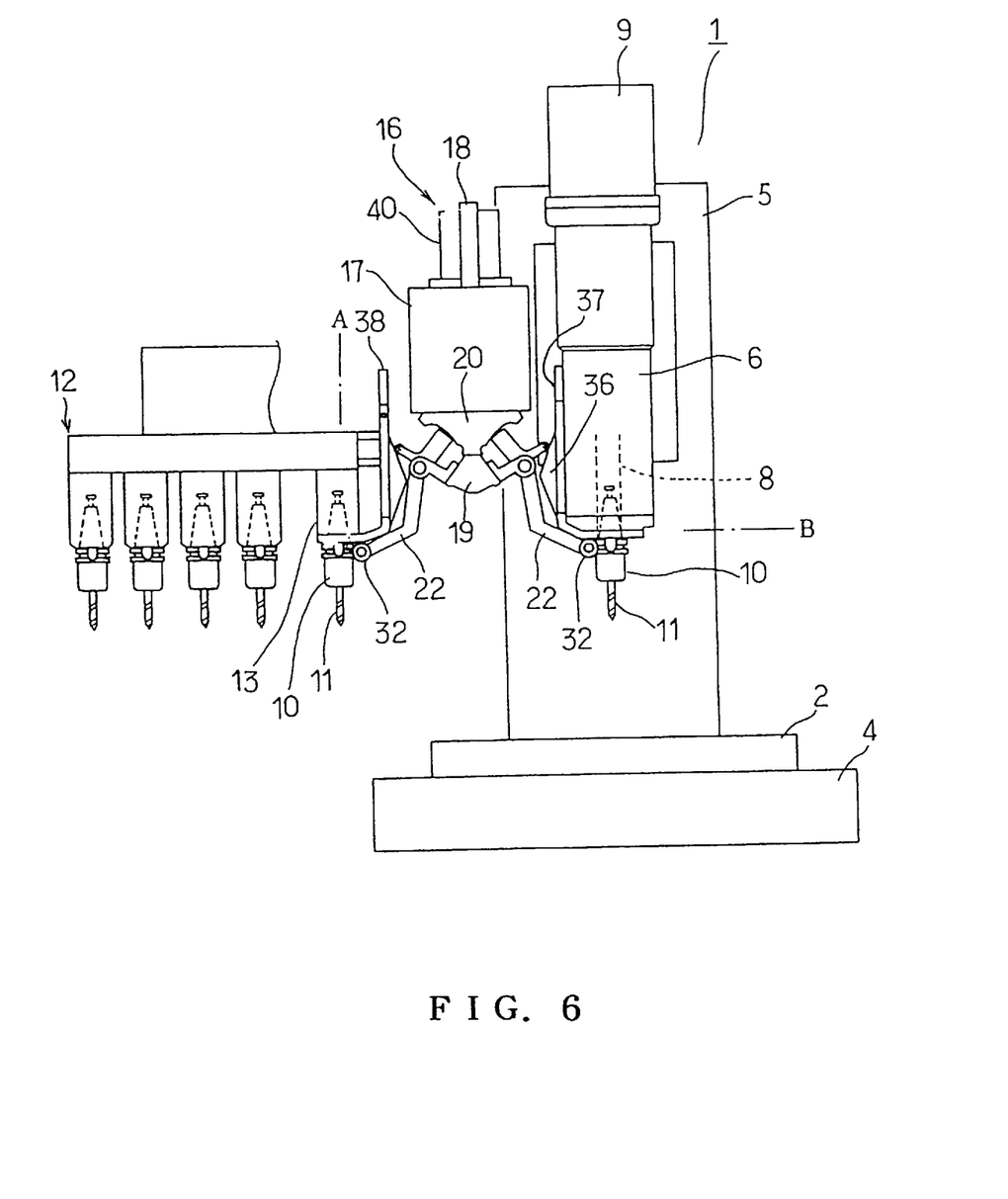
FIG. 6 is a view similar to FIG. 5, showing the case where the spindle head is located at a tool changing position.

In execution of the tool changing operation, the spindle head 6 is first moved upward so that the lower end thereof assumes the tool changing position B, as shown in FIG. 6. With the upward movement of the spindle head 6, the cam projection 36 at the spindle head 6 side is abutted against the cam follower 25 of the tool changing arm 22 at the spindle head 6 side, and the cam follower 32 at the distal end side is abutted against the underside of the cam plate 37. Consequently, the moving pins 30 on the distal end of the tool changing arm 22 at the spindle head 6 side face the chuck groove 33 of the tool holder 10 attached to the spindle 8.

When the tool changing drive motor 40 is driven in the state shown in FIG. 6, the engagement pin 47 side or the free end side of the vertically moving lever 44 is downwardly rotated with rotation of the cylindrical cam 41. With the movement of the lever 44, the center shaft 18 and accordingly the arm support 19 and the pair of tool changing arms 22 are downwardly moved. FIG. 7 shows the state in which the arm support and the tool changing arms 22 have downwardly been moved a predetermined amount. In this state, the second spur gear 53 at the center shaft 18 side and the first spur gear 52 are out of mesh engagement.

Upon downward movement of the arm support 19 and the tool changing arms 22, the cam followers 25 of the tool changing arms 22 are moved along the inclined faces of the cam projections 36 respectively. The tool changing arms 22 are rotated so that the distal ends of the arms reach the chuck grooves 33 of the corresponding tool holders 10 as shown by arrows C1 and C2 in FIG. 7 respectively. FIG. 7 shows the state in which the cam followers 25 have substantially reached the tops of the cam projections 36 respectively. In this state, the moving pins 30 at the distal ends of the tool changing arms 22 are completely inserted in the chuck grooves 33 to be engaged with them, whereupon the holding mechanisms 31 are ready to hold the corresponding tool holders 10 and accordingly tools 11, respectively. The tool holder 10 at the spindle head 6 side is released from the held state when the moving pins 30 are inserted into the chuck grooves 33. Accordingly, the tool holders 10 and accordingly the tools 11 are held by the corresponding holding mechanisms 31 of the tool changing arms 22, whereby the tools 11 are transferred from the sides of the spindle head 6 and the tool pot 13 to the tool changing arms 22, respectively. In the state of FIG. 7, the steel balls 27 of the tool changing arms 22 are fitted in the notch grooves 35 of the arm support collar 20 respectively.

Figure 8:
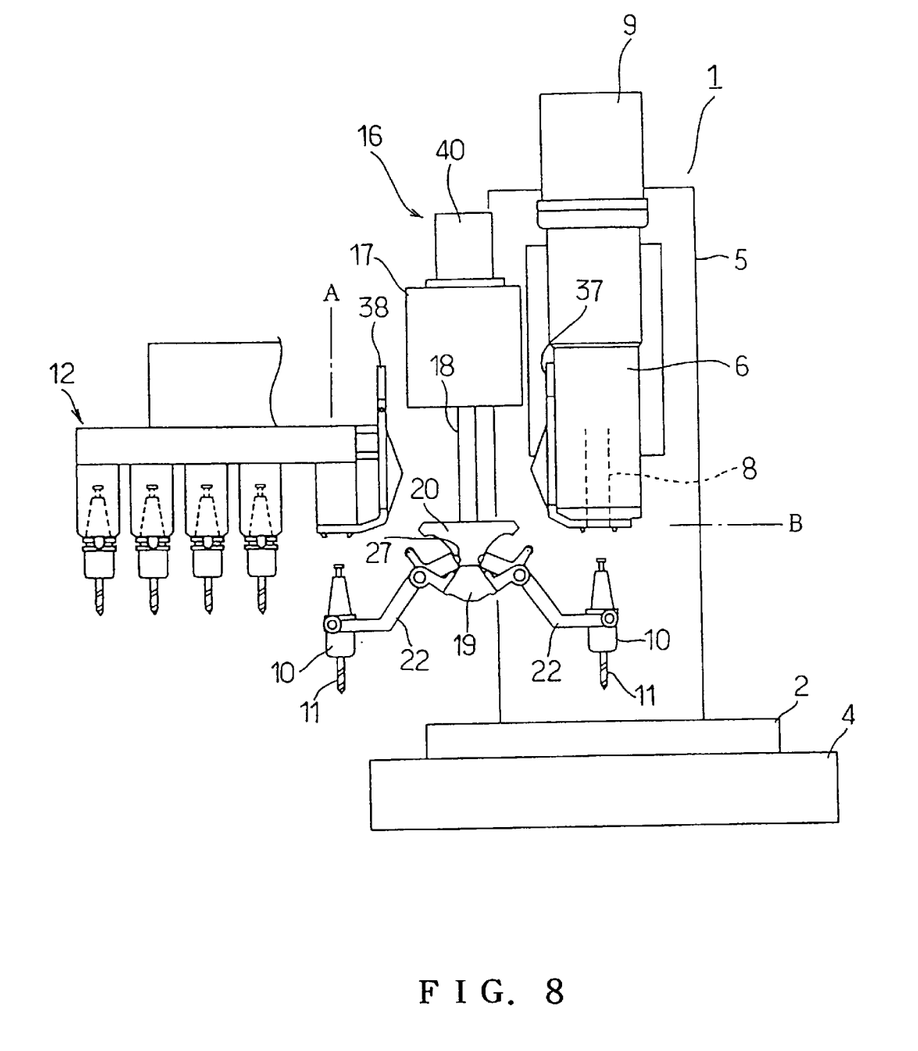
FIG. 8 is a view similar to FIG. 5, showing the condition where the tool changing arms have been moved downward with the tools being held.

The tool holders 10 held by the tool changing arms 22 are pulled out of the spindle head 6 and the tool pot 13 respectively as shown in FIG. 8 when the arm support 19 and the tool changing arms 22 are further moved downward in the state of FIG. 7. Since the steel balls 27 of the tool changing arms 22 are fitted in the notch grooves 35 of the arm support collar 20 respectively, the tools 11 remain held by the tool changing arms 22 in the vertical state.

FIG. 8 shows the state in which the tool changing arms 22 are moved to assume the lowermost positions respectively. The second spur gear 53 mounted on the center shaft 18 is meshed with the first spur gear 52 when the tool changing arms 22 are moved to the respective lowermost positions. See two dot chain lines in FIG. 3. In this state, the pin 42a of the pin gear 42 is engaged with the pin groove 51a of the Geneva gear 51 such that the Geneva gear is rotated the predetermined angle. Since the first spur gear 52 is rotated with the Geneva gear 51, the center shaft 18 and accordingly the tool changing arms 22 are rotated 180 degrees via the second spur gear 53. In this case, too, the tools 11 remain held by the tool changing arms 22 in the vertical state.

Upon rotation of the tool changing arms 22 by 180 degrees, the last used tool 11 is located below the tool pot 13 at the tool magazine 12 side, whereas the tool 11 to be subsequently used is located below the spindle head 6. Thus, the positions of the tools 11 are changed to each other.

Thereafter, the center shaft 18 and accordingly the tool changing arms 22 are moved upward when the engagement pin 47 side of the vertically moving lever 44 is rotated upward. Consequently, the tool holder 10 of the subsequently used tool 11 held by one of the tool changing arms 22 is inserted into the spindle head 6 from below, whereas the tool holder 10 of the last used tool 11 held by the other tool changing arm 22 is inserted into the tool pot 13 at the tool magazine 12 side. The tools 11 are thus held on the spindle head 6 and the tool pot 13 respectively. See the state of FIG. 7. The cam followers 32 at the distal ends of the tool changing arms 22 are abutted against the undersides of the cam plates 37 and 38 respectively.

The cam followers 32 of the tool changing arms 22 are pushed downward by the cam plates 37 and 38 relative to them respectively when the tool changing arms 22 are further moved upward. Consequently, the tool changing arms 22 are subjected to rotating forces acting in the directions opposite to the arrows C1 and C2 in FIG. 7 respectively, whereupon the steel balls 27 are disengaged from the respective notch grooves 35 to be abutted against the guide face 34. See FIG. 6. With rotation of the tool changing arms 22 in the respective directions opposite to the arrows C1 and C2, the moving pins 30 are disengaged from the chuck grooves 33, whereby the tool holders 10 are released from the holding of the holding mechanisms 31, respectively. One tool changing operation is thus completed. Upon completion of the tool changing operation, the machining is executed with use of the changed tool 11 and subsequently, the tool changing operation is repeated in the sequence as described above.

According to the foregoing embodiment, the holding mechanism 31 of each tool changing arm 22 comprises the moving pins 30 and the spring members 29 urging the moving pins in the directions of projection of the pins respectively. Thus, each holding mechanism 31 has a simple construction. Accordingly, this construction does not require a complicated opening and closing mechanism for opening and closing the gripping claws nor the control of the opening and closing operations of the mechanism as in the conventional tool changer of the finger type. Furthermore, a pair of tool changing arms 22 are rotated 180 degrees about the center shaft 18 parallel with the spindle 8. Consequently, the mechanical construction for the control of rotation can be simplified as compared with the conventional tool changer of the transfer type which necessitates the normal rotation, the reverse rotation and the adjustment of rotation angle in one tool changing operation. The tool changer of the embodiment is thus advantageous in the costs and can readily cope with high speed operation.

The tool changing arms 22 are reciprocally moved in the Z direction. Accordingly, the tools 11 can readily be pulled out of and inserted into the spindle 8 of the spindle head 6 and the tool pot 13 of the tool magazine 12 respectively. Furthermore, the cam plates 37 and 38 are mounted at the spindle head 6 side and the tool magazine 12 side respectively. The tool changing arms 22 are provided with the cam followers 25 and 32 brought into contact with the cam plates 37 and 38 respectively. The tool changing arms 22 are rocked about the support shafts 21 by the cam actions between the cam plates 37 and 38 and the cam followers 25 and 32 respectively when the spindle head 6 and the tool changing arms 22 are moved along the spindle 8 relative to the spindle. Consequently, the rocking motion of each of the tool changing arms 22 can readily be synchronized with the operations at the spindle head 6 side. Additionally, no drive means only for rocking the tool changing arms 22 is required.

A single drive motor 40 is used both as a drive source for the axial moving mechanism 49 moving the tool changing arms 22 in the Z direction and as a drive source for the rotating mechanism 54 rotating the tool changing arms 22 about the center shaft 18. Thus, two motors need not be provided as these drive sources. This results in a reduction in the manufacturing cost.

The tool pot 13 located at the standby position at the tool magazine 12 side and the cam plate 38 may be moved in the Z direction (or axially with respect to the spindle 8) integrally with the spindle head 6. In this case, the arm support 19 supporting the tool changing arms 22 need not be moved in the Z direction (or axially with respect to the spindle 8). In this construction, a mechanism for moving the spindle head 6, the tool pot 13 and the cam plate 38 in the Z direction constitutes the spindle side axial moving mechanism. Japanese patent publication No. 4-60774-B (1992) corresponding to U.S. Pat. No. 4,835,838 and Japanese patent publication No. 7-80109-B (1995) each disclose the construction for moving only the spindle head in the Z direction without moving the tool changing arms in the Z direction, thereby rocking the tool changing arms.

A converting mechanism may be provided between the spindle head 6 and the center shaft 18 for converting a force moving the spindle had 6 in the Z direction to a rotating force for rotating the center shaft 18. In the tool changing operation, with the movement of the spindle head 6 in the Z direction, the tool changing arms 22 may be rotated via the converting mechanism. In this case, the drive source (the drive motor 40 in the foregoing embodiment) only for rotating the tool changing arms 22 may be eliminated. Furthermore, the center shaft 18 may be moved upward and downward and rotated using the rotating force developed by the spindle motor 9, instead of the drive motor 40. In this case, a rotating force transmitting mechanism is preferably provided for moving the center shaft 18 upward and downward and rotating it by the rotating force of the spindle motor 9 when he spindle head 6 is moved upward to a predetermined position, for example.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A tool changer executing a change of tools between a spindle which is mounted along a spindle axis on a spindle head of a machine tool and to which a tool is detachably attached, and a tool magazine provided with a plurality of tools detachably attached thereto and locating a tool to be subsequently used at a standby position, the tool changer comprising:

an arm support disposed between the spindle head and the tool magazine and mounted to be reciprocally moved along the spindle relative to the spindle;

a pair of tool changing arms mounted for rocking motion on support shafts, the support shafts mounted on the arm support and extending generally perpendicular to said spindle axis, each tool changing arm having one end;

holding mechanisms provided on the ends of the tool changing arms respectively, each holding mechanism having a moving pin and urging means for urging the moving pin in a direction of projection of the moving pin, the moving pins being disengageably engaged with the tool attached to the spindle and the tool located a the standby position of the tool magazine when the tool changing arms are rocked about the support shafts so that the tools are detachably held by the holding mechanism respectively; and rotating means for rotating each of the tool changing arms by 180 degrees about a center shaft parallel with the spindle.

2. A tool changer according to claim 1, wherein the tool changing arms are reciprocally movable along the center shaft, and which further comprises arm side axial moving means for reciprocally moving the tool changing arms.

3. A tool changer according to claim 1, wherein the spindle and the tool magazine are reciprocally movable along the center shaft, and which further comprises spindle side axial moving means for reciprocally moving the spindle and the tool magazine.

4. A tool changer according to claim 1, which further comprises cams provided on the spindle head and the tool magazine and cam followers provided on the tool changing arms to come into contact with the cams, respectively, and wherein the tool changing arms are rocked about the support shafts by a cam operation of the cams and cam followers respectively when the spindle head and the tool changing arms are moved along the spindle relative to the spindle.

5. A tool changer according to claim 2, which further comprises cams provided on the spindle head and the tool magazine and cam followers provided on the tool changing arms to come into contact with the cams, respectively, and wherein the tool changing arms are rocked about the support shafts by a cam operation of the cams and cam followers respectively when the spindle head and the tool changing arms are moved along the spindle relative to the spindle.

6. A tool changer according to claim 3, which further comprises cams provided on the spindle head and the tool magazine and cam followers provided on the tool changing arms to come into contact with the cams, respectively, and wherein the tool changing arms are rocked about the support shafts by a cam operation of the cams and cam followers respectively when the spindle head and the tool changing arms are moved along the spindle relative to the spindle.

7. A machine tool comprising:

a spindle head;

a spindle mounted along an axis on the spindle head so that a tool is detachably attached thereto;

a tool magazine provided with a plurality of tools detachably attached thereto and locating a tool to be subsequently used at a standby position; and a tool changer executing a change of tools between the spindle and the tool magazine, the tool changer comprising:

an arm support disposed between the spindle head and the tool magazine and mounted to be reciprocally moved along the spindle relative to the spindle;

a pair of tool changing arms rockably mounted on support shafts further mounted on the arm support generally perpendicular to said spindle axis, respectively, each tool changing arm having one end;

holding mechanisms provided on the ends of the tool changing arms respectively, each holding mechanism having a moving pin and urging means for urging the moving pin in a direction of projection of the moving pin, the moving pins being disengageably engaged with the tool attached to the spindle and the tool located at the standby position of the tool magazine when the tool changing arms are rocked about the support shafts so that the tools are detachably held by the holding mechanisms respectively; and rotating means for rotating each of the tool changing arms by 180 degrees about a center shaft parallel with the spindle.

8. A machine tool according to claim 7, wherein the tool changing arms are reciprocally movable along the center shaft, and which further comprises arm side axial moving means for reciprocally moving the tool changing arms.

9. A machine tool according to claim 7, wherein the spindle and the tool magazine are reciprocally movable along the center shaft, and which further comprises spindle side axial moving means for reciprocally moving the spindle and the tool magazine.

10. A machine tool according to claim 7, which further comprises cams provided on the spindle head and the tool magazine and cam followers provided on the tool changing arms to come into contact with the cams, respectively, and wherein the tool changing arms are rocked about the support shafts by a cam operation of the cams and cam followers respectively when the spindle head and the tool changing arms are moved along the spindle relative to the spindle.

11. A machine tool according to claim 8, which further comprises cams provided on the spindle head and the tool magazine and cam followers provided on the tool changing arms to come into contact with the cams, respectively, and wherein the tool changing arms are rocked about the support shafts by a cam operation of the cams and cam followers respectively when the spindle head and the tool changing arms are moved along the spindle relative to the spindle.

12. A machine tool according to claim 9, which further comprises cams provided on the spindle head and the tool magazine and cam followers provided on the tool changing arms to come into contact with the cams, respectively, and wherein the tool changing arms are rocked about the support shafts by a cam operation of the cams and cam followers respectively when the spindle head and the tool changing arms are moved along the spindle relative to the spindle.

* * * * *